(12) United States Patent
Qurashi et al.

(10) Patent No.: US 11,441,232 B2
(45) Date of Patent: Sep. 13, 2022

(54) ANODIZATION METHOD FOR THE PRODUCTION OF ONE-DIMENSIONAL (1D) NANOARRAYS OF TIN OXIDE

(71) Applicant: King Fahd University of Petroleum and Minerals, Dhahran (SA)

(72) Inventors: Ahsanulhaq Qurashi, Dhahran (SA); Muhammad Raashid, Dhahran (SA); Ibrahim Khan, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 68 days.

(21) Appl. No.: 15/914,555

(22) Filed: Mar. 7, 2018

(65) Prior Publication Data

US 2019/0276947 A1    Sep. 12, 2019

(51) Int. Cl.
| | | |
|---|---|---|
| *C25D 11/34* | (2006.01) | |
| *C01G 19/02* | (2006.01) | |
| *C25B 1/04* | (2021.01) | |
| *C25B 1/55* | (2021.01) | |

(52) U.S. Cl.
CPC .............. *C25D 11/34* (2013.01); *C01G 19/02* (2013.01); *C25B 1/04* (2013.01); *C25B 1/55* (2021.01)

(58) Field of Classification Search
CPC ........... C25B 1/003; C25B 1/04; C25B 11/02; C25B 11/04; C25B 11/0442; C25B 11/0447; C25B 11/0452–11/0468; C25B 11/34; C25B 1/55; C25B 11/00–11/097; C01G 19/02
See application file for complete search history.

(56) References Cited

U.S. PATENT DOCUMENTS

| | | | |
|---|---|---|---|
| 2009/0011224 A1* | 1/2009 | Nagarajan | C25D 1/02 205/333 |
| 2010/0102033 A1* | 4/2010 | Choi | B82Y 30/00 216/101 |

FOREIGN PATENT DOCUMENTS

| | | |
|---|---|---|
| CN | 102634816 B | 11/2014 |
| CN | 104617263 A | 5/2015 |
| CN | 105355438 A | 2/2016 |

OTHER PUBLICATIONS

Iqbal et al ("Synthesis of novel nano-flowers assembled with nano-petals array of stannous oxide", Materials Letters, 2012, 75, pp. 236-239) (Year: 2012).*

(Continued)

*Primary Examiner* — Alexander W Keeling
(74) *Attorney, Agent, or Firm* — Oblon, McClelland, Maier & Neustadt, L.L.P.

(57) ABSTRACT

A one dimensional (1D) nanoarray of SnO nanostructures on a substrate is disclosed. The nanostructures of SnO have diameters of 200 nm-1 μm and lengths of 500 nm-3 μm, and are attached to and substantially perpendicular to the substrate. The one-dimensional nanoarray may have a nanostructure density of 220-300 nanostructures per 100 μm$^2$ substrate and a band gap energy of 2.36-2.46 eV. The one-dimensional nanoarray may be formed by anodization of Sn foil in an electrochemical cell subjected to a voltage of 15-25 V for 1-3 hours at room temperature. The formed one-dimensional nanoarray may be used for the photoelectrochemical decomposition of water into $O_2$ and $H_2$.

20 Claims, 8 Drawing Sheets

(56) References Cited

OTHER PUBLICATIONS

Zhou et al ("Band Gap Engineering of $SnO_2$ by Epitaxial Strain: Experimental and Theoretical Investigations", The Journal of Physical Chemistry C, 2014, 118, pp. 6448-6453) (Year: 2014).*
Lu et al. ("Study on the structure feature of SnO micro/nanostructure with interesting distribution characteristic of concentric annulus", Materials Letters, 2017, 186, pp. 171-174) (Year: 2017).*
Kaizra et al. ("Improved activity of SnO for the photocatalytic oxygen evolution", Journal of Saudi Chemical Society, 2018, 22, 76-83) (Year: 2018).*
Dai et al ("Growth and Structure Evolution of Novel Tin Oxide Diskettes", Journal of the American Chemical Society, 2002, 124, pp. 8673-8680) (Year: 2002).*
Abanades et al ("Novel two-step $SnO_2$/SnO water-splitting cycle for solar thermochemical production of hydrogen", International Journal of Hydrogen Energy, 2008, 33, pp. 6021-6030). (Year: 2008).*
Min Lai, et al., "Size-controlled electrochemical synthesis and properties of $SnO_2$ nanotubes", Nanotechnology, vol. 20, Apr. 15, 2009, pp. 1-6.
Do-Hwan Nam, et al., Template-Free Electrochemical Synthesis of Sn Nanofibers as High-Performance Anode Materials for Na-Ion Batteries:, ACS Nano, vol. 8, No. 11, 2014, pp. 11824-11835.
Farid Jamali Sheini, et al., "Electrochemical synthesis of Sn doped ZnO nanowires on zinc foil and their field emission studies", Thin Solid Films, vol. 519, Issue 1, Oct. 29, 2010, pp. 184-189.

* cited by examiner

ANODIZATION METHOD FOR THE PRODUCTION OF ONE-DIMENSIONAL (1D) NANOARRAYS OF TIN OXIDE

BACKGROUND OF THE INVENTION

Technical Field

The present invention relates to a one-dimensional (1D) nanoarray of tin oxide and an anodization method of producing the one-dimensional nanoarray.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recently, SnO (tin(II) oxide, or stannous oxide) has attracted considerable attention as a useful material due to its promising energy storage and harvesting applications in lithium battery and photo-electrochemical systems. Various methods have been explored for the synthesis of different SnO nanostructures, including sol-gel methods, hydrothermal synthesis, and more traditional wet chemistry techniques. However, these methods tend to either require high energy consumption or are not able to produce a regular array of nanostructures.

In view of the foregoing, one objective of the present invention is to provide a one-dimensional (1D) nanoarray of SnO nanostructures on a substrate, which may be made using an anodization method. The anodization method allows reliable synthesis of regular nanostructures while using a low input of energy. The one-dimensional nanoarray may then be used in a photo-electrochemical cell, for example, as a way to decompose water into $H_2$ and $O_2$.

BRIEF SUMMARY OF THE INVENTION

According to a first aspect, the present disclosure relates to a one-dimensional (1D) nanoarray of SnO on a substrate, where the nanoarray comprises SnO nanostructures having diameters of 200 nm-1 µm and lengths of 500 nm-3 µm, and the end of each nanostructure is attached to the substrate, and the longitudinal axis of each nanostructure is substantially perpendicular to the substrate.

In one embodiment, the nanostructures have conical tips.

In one embodiment, the one-dimensional nanoarray of SnO nanostructures has a nanostructure density of 220-300 nanostructures per 100 µm² substrate.

In one embodiment, the SnO is in a tetragonal crystal phase.

In one embodiment, the one-dimensional nanoarray has a band gap energy of 2.36-2.46 eV.

In one embodiment, the substrate is tin (Sn) foil.

According to a second aspect, the present disclosure relates to a method for producing the one-dimensional nanoarray of the first aspect. This method involves subjecting an electrochemical cell to 15-25 V for 1-3 hours, where this electrochemical cell has a working electrode of tin (Sn) foil in contact with an electrolyte solution and a counter electrode in contact with the electrolyte solution. In the process of this subjecting, nanostructures of SnO are grown on the tin foil, forming the one-dimensional nanoarray where the tin foil is the substrate.

In one embodiment, the counter electrode comprises gold, platinum, or carbon.

In a further embodiment, the counter electrode comprises platinum.

In a further embodiment, where the counter electrode comprises platinum, the counter electrode is in the form of a mesh.

In one embodiment, a surface area of the working electrode in contact with the electrolyte solution is not greater than a surface area of the counter electrode in contact with the electrolyte solution.

In one embodiment, the electrochemical cell does not comprise a third electrode.

In one embodiment, the electrolyte solution has an electrolyte concentration of 0.2-2.0 M.

In one embodiment, the electrolyte solution has a temperature of 20-30° C.

In one embodiment, the electrolyte solution comprises at least one selected from the group consisting of chromic acid, oxalic acid, sulfuric acid, phosphoric acid, and ammonium fluoride.

In one embodiment, the electrolyte solution comprises ammonium fluoride and phosphoric acid.

In one embodiment, before the subjecting, Sn is not present as an electrolyte in the electrolyte solution.

In one embodiment, the electrolyte solution does not contain a surfactant.

According to a third aspect, the present disclosure relates to a photo-electrochemical cell, comprising the one-dimensional nanoarray of the first aspect in contact with water.

According to a fourth embodiment, the present disclosure relates to a method of decomposing water into $H_2$ and $O_2$, which involves irradiating the photo-electrochemical cell of the third aspect with an electromagnetic radiation having a wavelength of 200-700 nm.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
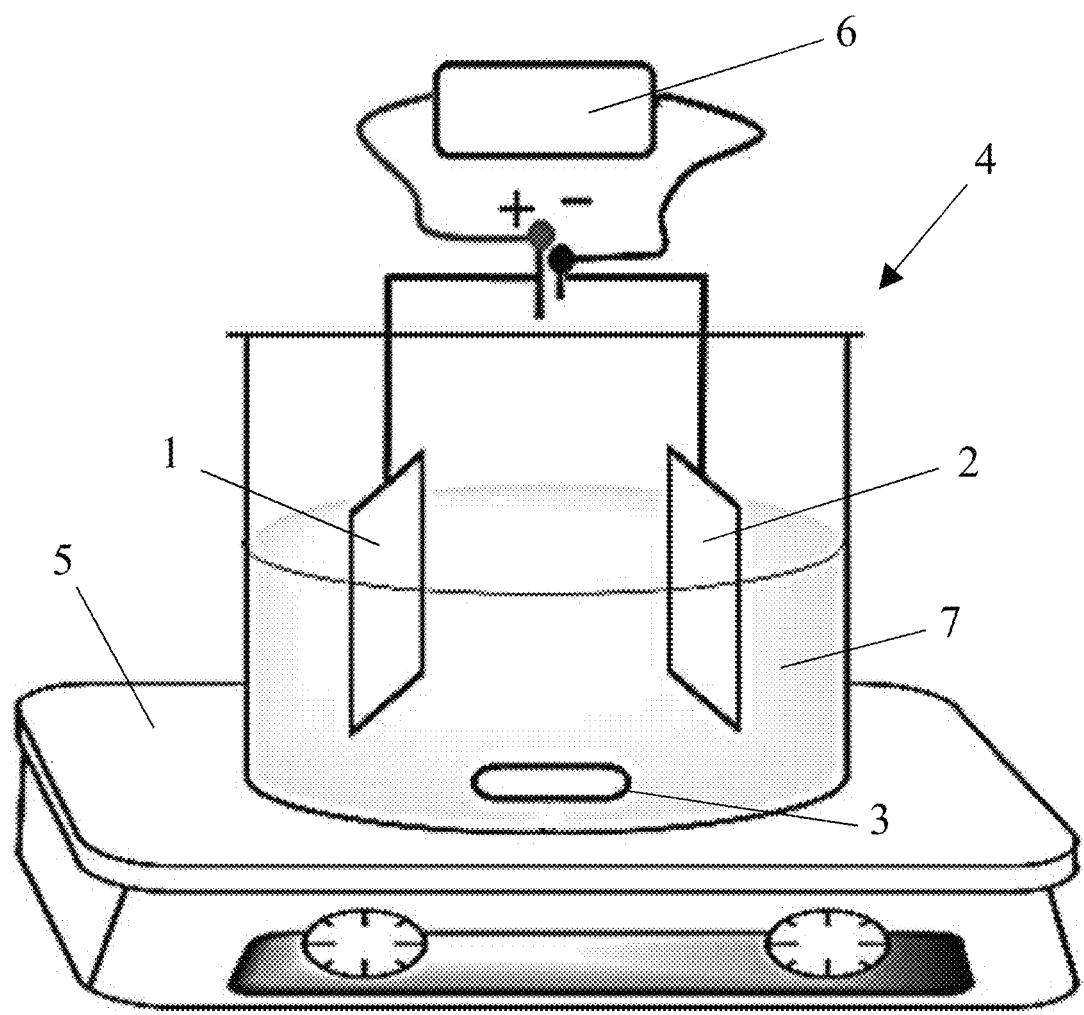
FIG. 1 is an example setup of an electrochemical cell for the two-electrode anodization of the one-dimensional nanoarray.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

For polygonal shapes, the term "diameter," as used herein, and unless otherwise specified, refers to the greatest possible distance measured from a vertex of a polygon through the center of the face to the vertex on the opposite side. For a circle, an oval, and an ellipse, "diameter" refers to the greatest possible distance measured from one point on the shape through the center of the shape to a point directly across from it.

As used herein, "compound" is intended to refer to a chemical entity, whether as a solid, liquid, or gas, and whether in a crude mixture or isolated and purified.

In addition, the present disclosure is intended to include all isotopes of atoms occurring in the present compounds and complexes. Isotopes include those atoms having the same atomic number but different mass numbers. By way of general example and without limitation, isotopes of hydrogen include deuterium and tritium. Isotopes of carbon include $^{13}C$ and $^{14}C$. Isotopically-labeled compounds of the disclosure can generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a one-dimensional (1D) nanoarray of SnO on a substrate, where comprising nanostructures of SnO having diameters of 200 nm-1 μm, preferably 300 nm-900 nm, more preferably 400 nm-750 nm, and lengths of 500 nm-3 μm, preferably 600 nm-2 μm, more preferably 700 nm-1 μm, an end of each nanostructure is attached to the substrate, and the longitudinal axis of each nanostructure is substantially perpendicular to the substrate.

Preferably the nanostructures comprise greater than 95%, more preferably greater than 99% SnO by weight. In one embodiment, the nanostructures may comprise other forms of tin oxide, such as tin(IV) oxide, or $SnO_2$, or the nanostructures may comprise metallic Sn, in either or both alpha (gray) or beta (white) allotropes. Where the nanostructures comprise compounds other than SnO, those compounds may be present at a weight percentage of 0.001-10 wt %, preferably 0.05-5 wt %, more preferably 0.1-2 wt %, relative to a total weight of the nanostructures. However, in some embodiments, the non-SnO compounds may be present at a weight percentage of less than 0.001 wt % or greater than 10 wt % relative to a total weight of the nanostructures.

In one embodiment, the nanostructures may be in the form of nanorods. As defined here, nanorods are elongated shapes with diameters or widths of 1 μm or less, preferably 800 nm or less, more preferably 700 nm or less. Here, the nanorods being "elongated" means that an aspect ratio of the longest dimension (length) of a nanorod to the next longest dimension (width) of the nanorod is 1.5:1-12:1, preferably 1.8:1-10:1, more preferably 2.0:1-8:1. In some embodiments, nanorods may be less elongated, with an aspect ratio of less than 1.5:1, or more elongated, with an aspect ratio of 12:1 or greater. Preferably the nanorods have a bottom part that is substantially cylindrical, and a tapered or curved tip that is substantially conical and extending from the bottom part. In this embodiment, a cross-section of a nanorod has a circular or elliptical shape, or some other rounded shape. Here, the nanorods have rounded sides. In other embodiments, the nanorods may be polygonal or prismatic, having planar sides and cross-sections that are polygons, for instance, rectangular cross-sections. The longitudinal axis of each nanorod or nanostructure being substantially perpendicular to the substrate means that the central axis or length of each nanorod or nanostructure forms a smallest angle of 60°-90°, preferably 70°-90°, more preferably 75°-90°, even more preferably 80°-90° with the surface of the substrate, where a smallest angle of 90° is exactly perpendicular. Preferably, the lengths or central axes of the nanorods or nanostructures are parallel with one another. In other embodiments, the lengths or central axes of the nanorods or nanostructures may be parallel with one another while forming a smallest angle of 60°-80°, preferably 62°-75°, more preferably 63°-70° with the plane of the substrate.

In one embodiment, the nanostructures may be hollow, similar to boxes or nanotubes. Preferably, however, the nanostructures are solid. In some embodiments, the nanostructures may be considered nanowhiskers, nanowires, nanopillars, nanoprisms, nanofibers, nanotubes, or nanocylinders. In other embodiments, two or more nanostructures side by side may merge together towards the substrate.

The ends of the nanostructures may have tips in a variety of configurations. Where the nanostructures are attached to a substrate, these tips refer to the unattached ends of the nanostructures, or the ends distal to the substrate. In one embodiment, the nanostructures may have flat tips that are either perpendicular to the sides of the nanostructures (as in a right cylinder) or tilted at an angle relative to the sides (as in a truncated cylinder). In another embodiment, the nanostructures may have curved tips, such as hemispherical or dome-shaped tips. In a preferred embodiment, the nanostructures have conical tips. Conical tips may not necessarily form the shape of a cone with straight edges leading to a singular point (in the strict sense of a cone), but rather, conical tips may comprise curved edges leading towards a blunt point. This shape may be similar to the pointed end of an ellipsoid, an egg, or a nose of a jet airplane. In one embodiment, the conical tips may have a parabolic shape. FIGS. 2B-2D show example images of nanostructures having conical tips. Preferably, the nanostructures are substantially rotationally symmetric around their central axis, as also shown in FIGS. 2B-2D.

While nanostructures with conical tips, or curved or tapered sides, may have varying widths or diameters throughout their length, preferably the width or diameter at the attachment point of the substrate is similar to the widths or diameters previously mentioned. In this embodiment, the width or diameter of the nanostructures may decrease in such a way that a width or diameter that is equal to half of the maximum width or diameter is located at a nanostructure length that is 5-33%, preferably 8-25%, more preferably 10-20% of the total nanostructure length measured from the top of the nanostructure, where "top" refers to the orientation of the nanostructures as depicted in FIGS. 2B-2D. However, in some embodiments, the nanostructure may be tapered, curved, or angled differently, so that the width or diameter equal to half of the maximum width or diameter is located at a nanostructure length that is less than 5%, or greater than 33%, of the total nanostructure length measured from the top of the nanostructure.

Preferably, in one embodiment, the nanostructures have a uniform shape. Alternatively, the shape may be non-uniform. As used herein, the term "uniform" refers to an average consistent shape that differs by no more than 10%, by no more than 5%, by no more than 4%, by no more than 3%, by no more than 2%, by no more than 1% of the distribution of nanostructures having a different shape. As used herein, the term "non-uniform" refers to an average consistent shape that differs by more than 10% of the distribution of nanostructures having a different shape. In one embodiment, the shape is uniform and at least 90% of the nanostructures are substantially cylindrical, and less than 10% are polygonal or substantially prismatic. In another embodiment, the shape is non-uniform and less than 90% of the nanostructures are substantially cylindrical, and greater than 10% are polygonal or substantially prismatic. In one embodiment, the nanostructures of the present disclosure are monodisperse, having a coefficient of variation or relative standard deviation, expressed as a percentage and defined as the ratio of the particle size standard deviation ($\sigma$) to the particle size mean ($\mu$) multiplied by 100, of less than 25%, preferably less than 10%, preferably less than 8%, preferably less than 6%, preferably less than 5%, preferably less than 4%, preferably less than 3%, preferably less than 2%. In a preferred embodiment, the nanostructures of the present disclosure are monodisperse having a particle size distribution ranging from 80% of the average particle size to 120% of the average particle size, preferably 90-110%, preferably 95-105% of the average particle size.

Nanoparticle characterization may be used to establish understanding and control of the one-dimensional nanoarray anodization and application. In one embodiment, it is envisioned that characterization is done using a variety of techniques. Exemplary techniques include, but are not limited to, electron microscopy (TEM, SEM), atomic force microscopy (AFM), ultraviolet-visible spectroscopy (UV-Vis), dynamic light scattering (DLS), X-ray photoelectron spectroscopy (XPS), X-ray fluorescence (XRF), powder X-ray diffraction (XRD), energy dispersive X-ray spectroscopy (EDX), thermogravimetric analysis (TGA), Fourier transform infrared spectroscopy (FTIR), matrix-assisted laser desorption/ionization time-of-flight mass spectrometry (MALDI-TOF), Rutherford backscattering spectrometry (RBS), dual polarization interferometry, time-of-flight secondary ion mass spectrometry (ToF-SIMS), electron energy loss spectroscopy (EELS), high-angle annular dark field (HAADF), near infrared (NIR) spectroscopy, nuclear magnetic resonance (NMR), or combinations thereof.

In one embodiment, the one-dimensional nanoarray has a nanostructure density of 220-300, preferably 230-280, more preferably 240-270, even more preferably 245-265 nanostructures per 100 $\mu m^2$ substrate. In alternative embodiments, the nanostructure density may be smaller than 220 or greater than 300 nanostructures per 100 $\mu m^2$ substrate. In one embodiment, the nanostructures are packed in a substantially regular array, wherein any 100 $\mu m^2$ region of the substrate comprises 85%-99%, preferably 90-98%, more preferably 95-98% nanostructures in a close-packed array, and a packing density that does not vary by more than 10%, preferably by no more than 7% of the bulk average nanostructure density.

In one embodiment, the nanostructures are discrete and separated by inter-nanostructure gaps or an inter-nanostructure distance of 1-50 nm, preferably 3-45 nm, preferably 5-40 nm, preferably 6-38 nm, preferably 7-35 nm, preferably 8-32 nm, most preferably 9-30 nm. The inter-nanostructure distance refers to the shortest distance between the outer edges of two neighboring nanostructures. In a preferred embodiment, the nanostructures of the present disclosure have an average surface to surface inter-nanostructure distance of less than 200% of their average diameter, preferably less than 150% of their average diameter, preferably less than 100% of their average diameter, preferably less than 50% of their average diameter, preferably less than 25% of their average diameter, preferably less than 10% of their average diameter, preferably less than 5% of their average diameter. In one embodiment, the nanostructures may have tapered or curved tips, and may be touching or merging with one another (that is, an inter-nanostructure gap of 0 nm) where they attach to the substrate. In one embodiment, the inter-nanostructure gaps may be in the form of pores or depressions where the substrate was removed during the anodization process. These pores or depressions may have diameters similar to the lengths of the inter-nanostructure distances listed above. The pores or depressions may have a maximum depth of 300 nm-3 $\mu m$, preferably 400 nm-2 $\mu m$, more preferably 500 nm-1 $\mu m$, even more preferably 600 nm-800 nm below that of the original plane of the substrate surface. The pores or depressions may have a greatest width or diameter of 50 nm-1 $\mu m$, preferably 100 nm-900 nm, more preferably 200 nm-750 nm, even more preferably 250 nm-600 nm. In one embodiment, the pores may be shaped with lengths, diameters, and tapers or curved edges similar to the geometry of nanostructures, described previously, being inverted into the substrate.

In one embodiment, inter-nanostructure gaps may be elongated, leading to the formation of grooves or channels between rows of nanostructures. These grooves or channels may have widths of 50 nm-1 $\mu m$, preferably 100 nm-900 nm, more preferably 200 nm-750 nm, and lengths of 1.5-15 $\mu m$, preferably 2-10 $\mu m$, more preferably 4-8 $\mu m$. An uninterrupted wall of a channel may be formed by 5-40, preferably 7-30, more preferably 10-28 consecutive nanostructures. In a further embodiment, these channels and rows of nanostructures may be substantially parallel with each other, as evident in FIG. 2A. In one embodiment, a row of nanostructures may be merged together closer to the substrate, forming a shape similar to a picket fence.

In one embodiment, the SnO is in a tetragonal crystal phase. For example, the SnO may be in a tetragonal PbO layer structure with Sn located at the four square pyramidal coordinates. In alternative embodiments, the SnO may be in a different crystal phase or may be in an amorphous phase. In one embodiment, the SnO may be in more than one crystal phase. Preferably, the crystal phase may be determined by analyzing X-ray diffraction patterns.

In one embodiment, the one-dimensional nanoarray has a band gap energy of 2.36-2.46 eV, preferably 2.37-2.45 eV, more preferably 2.39-2.43 eV. However, in alternative embodiments, the one-dimensional nanoarray may have a band gap energy of less than 2.36 eV or greater than 2.46 eV. The band gap energy may be influenced by the density of the nanostructures, their geometry, their dimensions, their regularity, and/or the type of substrate. In one embodiment, a person having ordinary skill in the art may be able to adjust the band gap energy to different values by changing those characteristics of the one-dimensional nanoarray.

In one embodiment, the substrate is tin (Sn) foil, and in a further embodiment, consists of no other metal. However, in some embodiments, the tin foil may not comprise 100% tin, but may comprise 3 wt % or less, 2 wt % or less, preferably 1 wt % or less of impurities, such as other metals, metal oxides, and adsorbed organic materials. In alternative embodiments, the substrate may be an alloy comprising Sn, such as indium tin oxide (ITO), or an alloy of Sn and Cu. The substrate may comprise Sn in either or both alpha (gray) or beta (white) allotropes.

In an alternative embodiment, other metals may be used in the anodization method to create nanostructures comprising different metal oxides. These metals may be aluminum, titanium, magnesium, zinc, niobium, tantalum, cadmium, gallium, thallium, lead, antimony, tungsten, zirconium, ruthenium, barium, selenium, bismuth, alloys thereof, or some other metal.

In one embodiment, the substrate may be rectangular with a length to width ratio of 1:1-5:1, preferably 1:1-3:1, more preferably 1:1-1.5:1, though in some embodiments, the substrate may have a length to width ratio of greater than 5:1. In one embodiment, the substrate may have a length or longest dimension of 0.4-10 cm, preferably 0.5-5 cm, more preferably 0.8-1.2 cm. In one embodiment, the substrate may have a width of 0.1-1.5 cm, preferably 0.2-1.0 cm, more preferably 0.3-0.6 cm. In one embodiment, the substrate may have a thickness of 0.001-4.00 mm, preferably 0.1-1.0 mm, more preferably 0.2-0.8 mm. However, in some embodiments, the substrate may have a longest dimension greater than 10 cm or smaller than 0.4 cm, a width greater than 1.5 cm or smaller than 0.1 cm, and/or a thickness smaller than 0.001 mm or greater than 4.00 mm. The substrate may be substantially planar, or may be curved or rolled into a tube or scroll. Preferably the substrate is substantially planar. In alternative embodiments, the substrate may be in a different form, such as a rod, wire, ring, disc, bead, multi-layered foil, or some other shape. In one embodiment, the substrate may comprise an outer layer of tin attached to a layer of a different material. For instance, the substrate may comprise a layer of tin deposited on a glass coverslip.

According to a second aspect, the present disclosure relates to an anodization method for producing the one-dimensional nanoarray of the first aspect. As defined here, anodization is an electrolytic passivation process used to increase the thickness of a metal oxide layer on the surface of a metal. During anodization of a metal, the metal oxide layer is grown by passing a direct current through an electrolytic solution, with the metal of interest serving as the anode (the positive electrode). The electrical current releases hydrogen at the cathode (the negative electrode) and oxygen at the surface of the anode, creating a build-up of the metal oxide.

Anodization is usually performed in an acidic electrolyte solution, which slowly dissolves the formed metal oxide, counteracting its deposition. This dual action of deposition and dissolution leads to the creation of nanostructures, such as nanopores and nanoparticles. In general, the metal oxide is both grown down into the metal surface and out from the metal surface by similar thicknesses. In addition, if a metal is anodized on all sides, where the metal is of the same type and in contact with the electrolyte solution, then all linear dimensions will increase by approximately the same thickness.

The nanopores may have diameters of 5-200 nm, preferably 10-150 nm, more preferably 12-50 nm, and these nanopores allow the electrolyte solution and current to reach the un-reacted metal and continue growing the metal oxide layer to greater thicknesses beyond those produced by just autopassivation. However, in some embodiments, following the anodization process, these nanopores may permit air or water to reach un-reacted metal and initiate corrosion if not sealed. Thus, for certain anodized metals, a protective dye and/or corrosion inhibitor may be applied. In some embodiments, crevices, cracks, or depleted regions larger than the nanopores discussed above may be formed during the anodization process.

Several parameters of an anodization process may be modified to lead to different sizes and morphologies of nanostructures. These parameters include, but are not limited to, electrolyte type and concentration, acidity, solution temperature, current, voltage, stirring rate, electrode surface area, electrode type, and exposure time. A variable DC current may be applied at a fixed voltage, or a fixed DC current may be applied at a variable voltage. In some instances, AC current or pulsed current may be used. A person having ordinary skill in the art may be able to adjust these and other parameters, to achieve different desired nanostructures.

According to this second aspect, this method involves subjecting an electrochemical cell to 15-25 V, preferably 17-23 V, more preferably 18-22 V for 1-3 hours, preferably 1.5-2.5 hours, more preferably 1.8-2.2 hours, or about 2 hours. In other embodiments, however, the electrochemical cell may be subjected to less than 15 V or more than 25 V, and/or for a time shorter than 1 hour or longer than 3 hours. This electrochemical cell has a working electrode of tin (Sn) foil in contact with an electrolyte solution and a counter electrode in contact with the electrolyte solution. In the process of this subjecting, nanostructures of SnO are grown on the tin foil, forming the one-dimensional nanoarray, where the tin foil is the substrate. In an alternative embodiment, the subjecting may use a lower voltage for a longer time, or a higher voltage for a shorter time, in order to achieve similar results.

The working electrode may be considered the anode, and the counter electrode may be considered the cathode. Thus, in one embodiment, the working electrode is the positive electrode, and the counter electrode is the negative electrode. However, in an alternative embodiment where the electrochemical cell is subjected to alternating current (AC), or the polarity of the electrochemical cell is otherwise switched, the working electrode may momentarily become the negative electrode while the counter electrode momentarily becomes the positive electrode.

In one embodiment, the anodization method may be used to make one-dimensional nanoarrays having dimensions different than those mentioned in the first aspect. For instance, SnO nanostructures may be produced that have diameters smaller than 200 nm or greater than 1 μm, and/or lengths smaller than 500 nm or greater than 3 μm. In a related embodiment, the anodization method may be used to make a one-dimensional nanoarray having a nanostructure density of less than 220 or greater than 300 nanostructures per 100 μm$^2$ substrate.

In an alternative embodiment, the anodization method may be used to make SnO in the form of nanostructures that are not nanorods. For instance, the SnO may be made in the form of nanoparticles, nanosheets, nanoplatelets, nanocrystals, nanospheres, nanorectangles, nanotriangles, nanopentagons, nanohexagons, nanoprisms, nanodisks, nanocubes, nanoribbons, nanorods, nanobeads, nanotoroids, nanolaminas, nanoshells, nanogranules, nanowhiskers, nanoflakes, nanofoils, nanopowders, nanoboxes, nanostars, tetrapods, nanobelts, nano-urchins, nanofloweres, etc. and mixtures thereof.

In one embodiment, the working electrode may be perforated, scratched, polished, etched, or modified in some other way before the subjecting. In another embodiment, the working electrode may be cleaned with a solvent such as, for example, acetone or ethanol and/or a detergent such as an industrial detergent of TFD4 type. This cleaning may be carried out in an ultrasonication bath. In other embodiments, cleaning may involve UV irradiation or exposure to argon plasma and/or oxygen plasma. These cleaning steps may be used to avoid contamination by external agents such as organic pollutants.

During the anodization process, the current density drawn on the working electrode surface may be 1-1,000 mA/cm$^2$, preferably 5-600 mA/cm$^2$, more preferably 10-300 mA/cm$^2$, however, in some embodiments, the current density may be less than 1 mA/cm$^2$ or greater than 1,000 mA/cm$^2$. In other embodiments, the voltage or the exposed surface area of the electrode may be adjusted in order to achieve a certain current density.

In an alternative embodiment, the one-dimensional nanoarray may be formed by lithography, more preferably nanolithography. Nanolithography techniques may be categorized as in series or parallel, mask or maskless/direct-write, top-down or bottom-up, beam or tip-based, resist-based or resist-less methods all of which are acceptable in terms of the present disclosure. Exemplary nanolithography techniques include, but are not limited to, optical lithography, photolithography, directed self-assembly, extreme ultraviolet lithography, electron beam lithography, electron beam direct write lithography, multiple electron beam lithography, nanoimprint lithography, step-and-flash imprint lithography, multiphoton lithography, scanning probe lithography, dip-pen nanolithography, thermochemical nanolithography, thermal scanning probe lithography, local oxidation nanolithography, molecular self-assembly, stencil lithography, X-ray lithography, laser printing of single nanoparticles, magnetolithography, nanosphere lithography, proton beam writing, charged particle lithography, ion projection lithography, electron projection lithography, neutral particle lithography and mixtures thereof. In another alternative embodiment, the one-dimensional nanoarray may be formed by a sol-gel or chemical vapor deposition method. In another alternative embodiment, the one-dimensional nanoarray may be synthesized by two or more techniques, for instance, a nanolithography method and then an electrodeposition method.

The SnO nanostructures in these forms may be attached to or detached from the working electrode substrate. Preferably the SnO nanostructures are attached to the working electrode substrate.

In one embodiment, the counter electrode comprises gold, platinum, or carbon. In a further embodiment, the counter electrode comprises platinum. In one embodiment, the counter electrode and/or the working electrode may be in the form of a wire, a rod, a cylinder, a tube, a scroll, a sheet, a piece of foil, a woven mesh, a perforated sheet, or a brush. The counter electrode and/or the working electrode may be polished in order to reduce surface roughness or may be texturized with grooves, channels, divots, microstructures, or nanostructures. Similar to what was mentioned for the substrate, the counter electrode may comprise impurities, an alloy comprising Sn, or other metals favorable to the anodization method. The counter electrode may comprise Sn in either or both alpha (gray) or beta (white) allotropes.

In a further embodiment, where the counter electrode comprises platinum, the counter electrode is in the form of a mesh. Alternatively, the counter electrode may comprise some other electrically-conductive material such as platinum-iridium alloy, iridium, titanium, titanium alloy, stainless steel, gold, cobalt alloy and/or some other electrically-conductive material, where an "electrically-conductive material" as defined here is a substance with an electrical resistivity of at most $10^{-6}$ Ω·m, preferably at most $10^{-7}$ Ω·m, more preferably at most $10^{-8}$ Ω·m at a temperature of 20-25° C. In another alternative embodiment, the working electrode may not comprise tin, but may comprise any of the previously mentioned metals.

In a preferred embodiment, the counter electrode has an outer surface comprising an essentially inert, electrically conducting chemical substance, such as platinum, gold, or carbon. In another embodiment, the counter electrode may comprise solid platinum, gold, or carbon. The form of the counter electrode may be generally relevant only in that it needs to supply sufficient current to the electrolyte solution to support the anodization current required for the formation of the one-dimensional nanoarray in the anodization process. The material of the counter electrode should thus be sufficiently inert to withstand the chemical conditions in the electrolyte solution, such as acidic pH values, without substantially degrading during the anodization process. The counter electrode preferably should not leach out any chemical substance that interferes with the anodization process or might lead to undesirable contamination of the one-dimensional nanoarray formed during anodization.

In one embodiment, the counter electrode in the form of a mesh may have a nominal aperture or pore diameter of 0.05-0.6 mm, preferably 0.1-0.5 mm, more preferably 0.2-0.4 mm, and/or a wire diameter of 0.01-0.5 mm, preferably 0.08-0.4 mm, more preferably 0.1-0.3 mm. In other embodiments, the counter electrode may be considered a gauze with a mesh number of 40-200, preferably 45-150, more preferably 50-100. In other embodiments, the counter electrode may be in the form of a perforated sheet or a sponge. In one embodiment, the counter electrode may be in the form of a mesh with one or more bulk dimensions (length, width, or thickness) as previously described for the working electrode. In a further embodiment, the counter electrode may be in the form of a mesh with similar a length and width as described for the working electrode.

In one embodiment, a surface area of the working electrode in contact with the electrolyte solution is not greater than a surface area of the counter electrode in contact with the electrolyte solution. In one embodiment, the two surface areas are approximately equal, meaning that the ratio of the first surface area to the second is 1.0:1.1-1.1:1.0, preferably 1.00:1.05-1.05:1.00, more preferably 1.00:1.01-1.01:1.00. In another embodiment, a ratio of the surface area of the working electrode in contact with the electrolyte solution to the surface area of the counter electrode in contact with the electrolyte solution is 1:1-1:10,000, preferably 1:5-1:1,000, more preferably 1:10-1:500, even more preferably 1:15-1:120. In one embodiment, such surface area ratios may arise when the working electrode is in the form of a wire, rod, plate, or foil, and the counter electrode is in the form of a mesh or a nanostructured material. In an exemplary embodiment, the working electrode in contact with the electrolyte solution may be in the form of a rectangular piece of foil, while the counter electrode may be in the form of a mesh with the same bulk dimensions (length and width) as the rectangular piece of foil.

In one embodiment, the electrochemical cell does not comprise a third electrode. In some embodiments, the electrochemical cell may comprise a reference electrode as a third electrode. The reference electrode may be a standard hydrogen electrode (SHE), a normal hydrogen electrode (NHE), a reversible hydrogen electrode (RHE), a saturated calomel electrode (SCE), a copper-copper(II) sulfate electrode (CSE), a silver chloride electrode, a pH-electrode, a palladium-hydrogen electrode, a dynamic hydrogen electrode (DHE), a mercury-mercurous sulfate electrode, or some other type of electrode.

In one embodiment, the potential may be applied to the electrodes by a battery, such as a battery comprising one or more electrochemical cells of alkaline, lithium, lithium-ion, nickel-cadmium, nickel metal hydride, zinc-air, silver oxide, and/or carbon-zinc. In another embodiment, the potential may be applied through a potentiostat or some other source of direct current, such as a photovoltaic cell. In one embodiment, a potentiostat may be powered by an AC adaptor, which is plugged into a standard building or home electric utility line. Preferably the potentiostat is able to supply a relatively stable voltage, such as a voltage that varies by no more than 5%, preferably by no more than 3%, preferably by no more than 1.5% of an average value throughout the subjecting. In another embodiment, the voltage may be modulated, such as being increased or decreased linearly, being applied as pulses, or being applied with an alternating current.

In one embodiment, the electrolyte solution has an electrolyte concentration of 0.2-2.0 M, preferably 0.3-1.8 M, more preferably 0.4-1.6 M, even more preferably 0.5-1.5 M. However, in some embodiments, the electrolyte concentration may be less than 0.2 M or greater than 2.0 M.

In one embodiment, the electrolyte solution comprises at least one selected from the group consisting of chromic acid, oxalic acid, sulfuric acid, phosphoric acid, and ammonium fluoride.

Preferably, the electrolyte solution comprises ammonium fluoride and phosphoric acid. In one embodiment, ammonium fluoride and phosphoric acid may each be present at a concentration of 0.2-1.0 M, preferably 0.3-0.8 M, more preferably 0.4-0.6 M. In another embodiment, ammonium fluoride and phosphoric acid may be present at a combined concentration of 0.2-1.0 M, preferably 0.3-0.8 M, preferably 0.4-0.6 M, where a molar ratio of ammonium fluoride to phosphoric acid may be 1:10-10:1, preferably 1:5-5:1, more preferably 1:2-2:1, or, in one embodiment, about 1:1. In other embodiments, the electrolyte solution may comprise trichloroacetic acid, gluconic acid, formic acid, perchloric acid, hydrochloric acid, nitric acid, ammonium sulfate, ammonium chloride, sodium chloride, potassium chloride, toluenesulfonic acid, benzenesulfonic acid and/or tartaric acid at a concentration of 0.01-1 M, preferably 0.05-0.8 M, more preferably 0.1-0.7 M. The electrolyte solution may have a pH of 1.0-7.0, preferably 1.2-6.0, more preferably 1.5-5.0, though in some embodiments, the pH may be less than 1.0 or greater than 7.0. In one embodiment, the subjecting may be carried out starting with one type of electrolyte solution, and then changed to a different type of electrolyte solution.

In one embodiment, the electrolyte solution has a temperature of 20-30° C., preferably 22-28° C., more preferably 22-27° C., or about room temperature. In one embodiment, the electrochemical cell is operated at an ambient temperature of 20-30° C. without further cooling. In another embodiment, the electrochemical cell is operated while using a cooling mechanism, such as a water bath, ice packs, cooled air, or tubing containing a flowing coolant. In other embodiments, the electrolyte solution may have a temperature lower than 20° C. or greater than 30° C., and in a further embodiment, the electrochemical anodization to form the nanostructures may occur successfully at those temperatures. Preferably the electrochemical cell is maintained at atmospheric pressures, however, in alternative embodiments, the pressure may be decreased below or increased above atmospheric pressures.

Preferably, to maintain uniform concentrations and/or temperatures of the electrolyte solution, the electrolyte solution may be continuously stirred or agitated during the step of the subjecting. This stirring or agitating may be by a magnetic stir bar, a stirring rod, an impeller, a shaking platform, a pump, a sonicator, a gas bubbler, or some other device. Preferably the stirring is done by an impeller or a magnetic stir bar.

In one embodiment, before the subjecting, Sn is not present as an electrolyte. In this embodiment, the electrolyte solution does not contain a dispersion or dissolved Sn in the form of atomic Sn, Sn(I), Sn(II), or a compound containing Sn. Here, the only Sn present in the entire system before subjecting the electric potential is the Sn of the tin foil. In other words, the nanostructures are formed only from Sn that originates from the tin foil. However, in an alternative embodiment, aqueous Sn(I) or Sn(II) may be present in the electrolyte solution before the subjecting, for example, by mixing a Sn salt such as $SnCl_2$. In another alternative embodiment, colloidal Sn or Sn nanoparticles may be added to the electrolyte solution before the subjecting. In these alternative embodiments, where Sn(I) or Sn(II) may be present in the electrolyte solution before the subjecting, the electrochemical process that grows the one-dimensional nanoarray may not necessarily be anodization, but some other electrodeposition process.

In one embodiment, the electrolyte solution does not contain a surfactant. However, in alternative embodiments, a surfactant may be present to direct the anodization and growth of the nanostructures, thus influencing their geometry.

Exemplary ionic surfactants include, but are not limited to, (1) anionic (based on sulfate, sulfonate or carboxylate anions), for example, perfluorooctanoate (PFOA or PFO), perfluorooctanesulfonate (PFOS), sodium dodecyl sulfate (SDS), ammonium lauryl sulfate, and other alkyl sulfate salts, sodium laureth sulfate (also known as sodium lauryl ether sulfate (SLES)), alkyl benzene sulfonate, soaps, and fatty acid salts; (2) cationic (based on quaternary ammonium cations), for example, cetyl trimethylammonium bromide (CTAB) (also known as hexadecyl trimethyl ammonium bromide), and other alkyltrimethylammonium salts, cetylpyridinium chloride (CPC), polyethoxylated tallow amine (POEA), benzalkonium chloride (BAC), and benzethonium chloride (BZT); and (3) zwitterionic (amphoteric), for example, dodecyl betaine, cocamidopropyl betaine, and coco ampho glycinate.

Exemplary nonionic surfactants include, but are not limited to, alkyl poly(ethylene oxide), alkylphenol poly(ethylene oxide), copolymers of poly(ethylene oxide) and poly (propylene oxide) (commercially known as Poloxamers or Poloxamines), polyoxyethylene octyl phenyl ether (TRITON X-100®), alkyl polyglucosides, for example, octyl glucoside and decyl maltoside, fatty alcohols, for example, cetyl alcohol and oleyl alcohol, cocamide MEA, cocamide DEA, and polysorbates (commercially known as TWEEN 20, TWEEN 80), for example, dodecyl dimethylamine oxide.

Exemplary biological surfactants include, but are not limited to, micellular-forming surfactants or surfactants that form micelles in solution, for example, DNA, vesicles, phospholipids, and combinations thereof. In other embodiments, other additives may be used to direct the growth of the nanostructures, such as polyethylene glycol or sodium citrate By incorporating at least one surfactant in the electrolyte, the nanostructures may become ordered, for example, by self-assembly. A surfactant or additive such as those listed above may be present in the electrolyte solution at a concentration of 1-500 mM, preferably 10-400 mM, more preferably 50-350 mM.

According to a third aspect, the present disclosure relates to a photo-electrochemical cell, comprising the one-dimensional nanoarray of the first aspect. A photo-electrochemical cell may be as simple as an electrochemical cell that has a transparent window to allow electromagnetic radiation to reach the electrode of interest. Alternatively, a photo-electrochemical cell may be enclosed in a flat, transparent housing so that the photo-active electrode has a greater surface area facing an irradiation source. A photo-electrochemical cell may be used with mirrors, lenses, shutters, optical filters, optical fibers, or other optical devices in order to modulate or direct an incoming electromagnetic radiation. The incoming electromagnetic radiation may have a wavelength of 200-700 nm, preferably 210-600 nm, more preferably 220-575 nm, even more preferably 230-565 nm. Preferably the incoming electromagnetic radiation comprises one or more wavelengths that have an energy equivalent or greater than the band gap energy of the one-dimensional nanoarray. For example, the incoming electromagnetic radiation may have one or more wavelengths of 10-515.3 nm, preferably 150-500 nm, more preferably 200-400 nm, where wavelengths in the range of 10-400 nm may be considered UV radiation. In a preferred embodiment, the photo-electrochemical cell includes water in contact with the one-dimensional nanoarray. In a further embodiment, the water may be present in an aqueous electrolyte solution.

In an alternative embodiment, the one-dimensional nanoarray may be used in the field of batteries, fuel cells, hydrogen sensors, semiconductors, photovoltaics, liquid crystal screens, plasma screens, touch screens, OLEDs, antistatic deposits, optical coatings, reflective coverings, anti-reflection coatings, and/or reaction catalysis. Similarly, in one embodiment, the one-dimensional nanoarray may be coated with another material. For example, the one-dimensional nanoarray may be coated with a layer of gold. A gold-coated one-dimensional nanoarray may then be used for analyte detection using surface enhanced Raman scattering (SERS).

According to a fourth embodiment, the present disclosure relates to a method of decomposing water into $H_2$ and $O_2$, which involves irradiating the photo-electrochemical cell of the third aspect with an electromagnetic radiation having a wavelength of 200-700 nm, preferably 210-600 nm, more preferably 220-575 nm, even more preferably 230-565 nm, where the photo-electrochemical cell comprises water in contact with the one-dimensional nanoarray. Preferably the source of the electromagnetic radiation is sunlight, though in some embodiments, the irradiation source may be a flame, a lantern, a gas discharge lamp (such as a xenon, sodium, or mercury vapor lamp), an incandescent bulb, a laser, a fluorescent lamp, an electric arc, a light emitting diode (LED), a cathode ray tube, or some other source of light.

The examples below are intended to further illustrate protocols for preparing, characterizing the one-dimensional nanoarray, and uses thereof, and are not intended to limit the scope of the claims.

Example 1

Synthesis of Tin(II) Oxide (SnO) Nanoarrays by Anodization Method

Provided herein is a highly homogeneous, uniform, large-scale SnO 1-D nanoarray fabricated by a simple low voltage and room temperature anodization method. By fine-tuning the reaction parameters of anodization method, the morphology of the one-dimensional nanoarray of SnO nanostructures may be precisely tailored.

The particular aspect of the invention is that this method is fabricating one-dimensional nanoarrays on a tin substrate via an anodization/etching process in electrolytic solution in the presence of an electric field. The current passed through the electrolyte solution, which is in contact with two electrodes. The voltage and current may be changed according to the surface anodization. Additional features of the invention will become ostensible from the following description.

Features of the invention are now described with reference to FIGS. 1 to 6. These figures describe, using common reference characters, components and other features of the one-dimensional nanoarray, electrochemical cell, and method of use.

FIG. 1 shows the anodization or electrochemical cell 4 of the present invention. The electrochemical cell 4 comprises the electrodes 1, 2, electrolyte solution 7, and magnetic stirrer 3, which are all held in a non-conducting vessel.

For the operation of the electrochemical cell 4 for the anodization of the tin foil and creation of the one-dimensional nanoarray, the potentiostat 6 applies a constant voltage of 20 V for two hours across the working electrode 1 and the counter electrode 2 at room temperature. Polished tin (Sn) foil (0.5 cm×1 cm) serves as the working electrode 1, or anode. A platinum (Pt) mesh electrode (0.5 cm×1 cm) was used as a counter electrode 2, or cathode. A magnetic stir bar 3 is rotated with the help of a magnetic stir plate 5 to stir the electrolyte solution 7, keeping the concentration homogeneous throughout the course of anodization. Here, the electrolyte solution 7 comprises 0.5 M each of $NH_4F$ and $H_3PO_4$, and is in contact with both electrodes 1, 2. The stir plate is not heated.

Figure 2A:
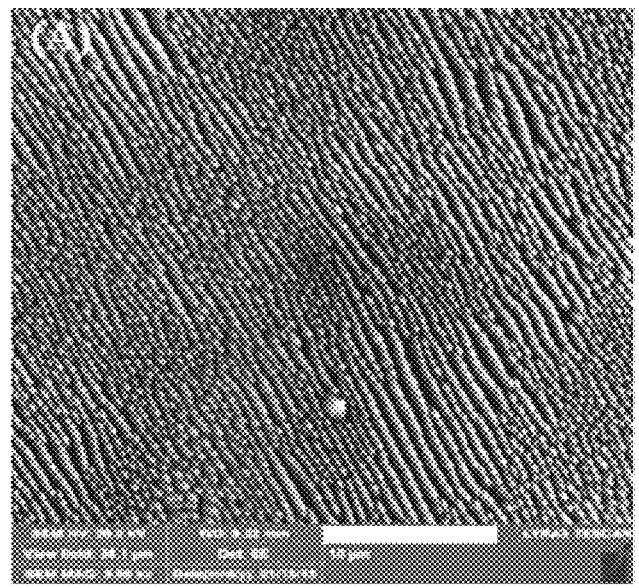
FIG. 2A is a field emission scanning electron microscope (FESEM) image of the one-dimensional nanoarray with a scale bar of 10 µm.
Figure 2B:
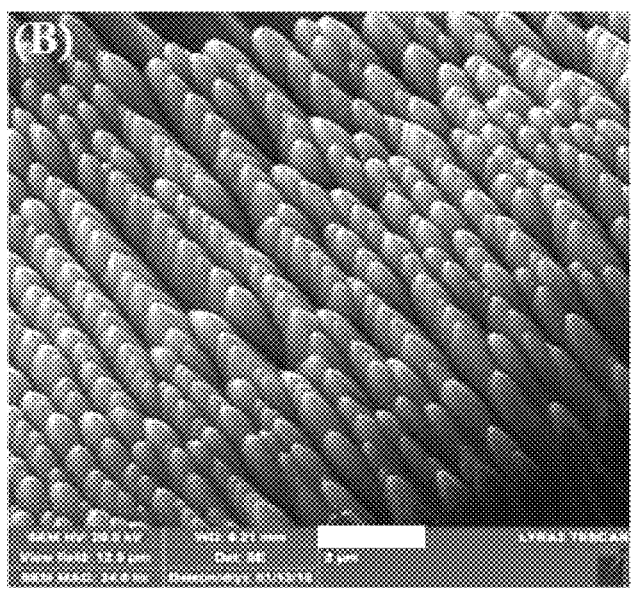
FIG. 2B is a FESEM image of the one-dimensional nanoarray with a scale bar of 5 µm.
Figure 2C:
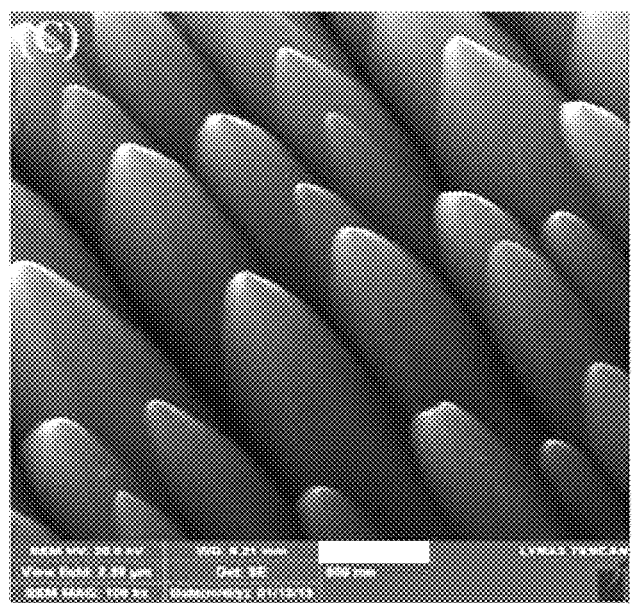
FIG. 2C is a FESEM image of the one-dimensional nanoarray with a scale bar of 500 nm.
Figure 2D:
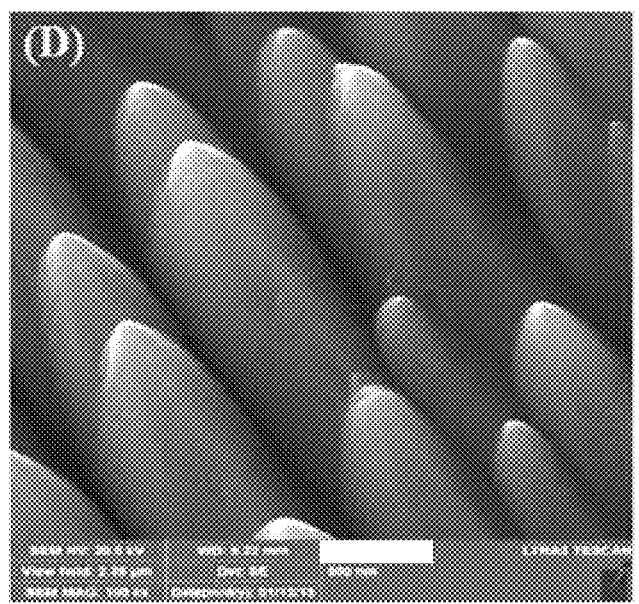
FIG. 2D is another FESEM image of the one-dimensional nanoarray with a scale bar of 500 nm.

FIGS. 2A and 2B show field emission scanning electron microscope (FESEM) images of the resulting one-dimensional nanoarray, with scale bars of 10 μm and 2 μm, respectively. FIGS. 2C and 2D also show FESEM images of the array, both images with scale bars of 500 nm. FIGS. 2A-2D show that clearly defined nanostructures may be formed in regular arrays over relatively large areas by room temperature anodization.

Figure 3:
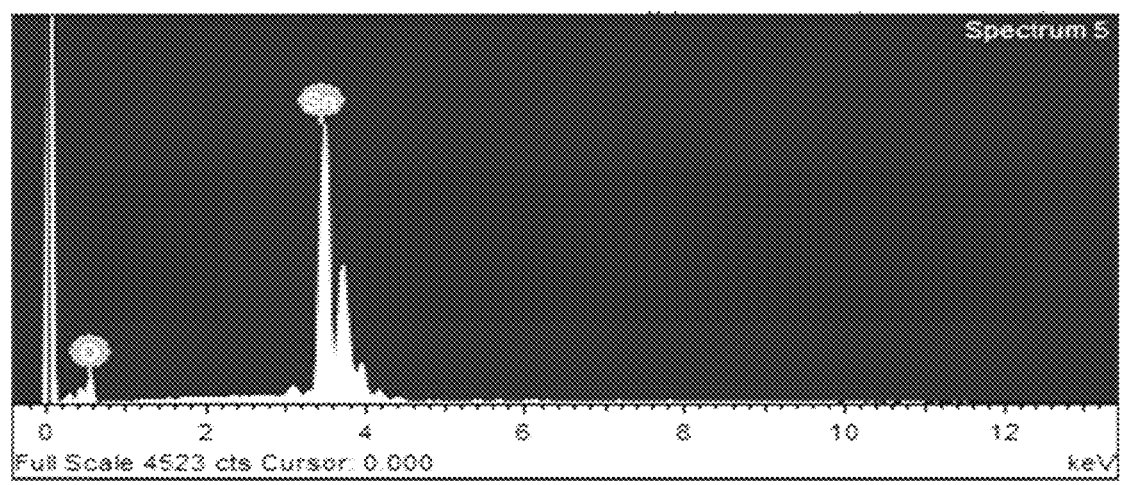
FIG. 3 is an energy-dispersive X-ray (EDX) spectrum of the one-dimensional nanoarray.

FIG. 3 is an energy-dispersive X-ray (EDX) spectrum of the one-dimensional nanoarray, which confirms the existence of SnO due to the peaks for Sn and O at relative positions having a 74:26 ratio by weight, respectively (shown by bar graph).

Figure 4:
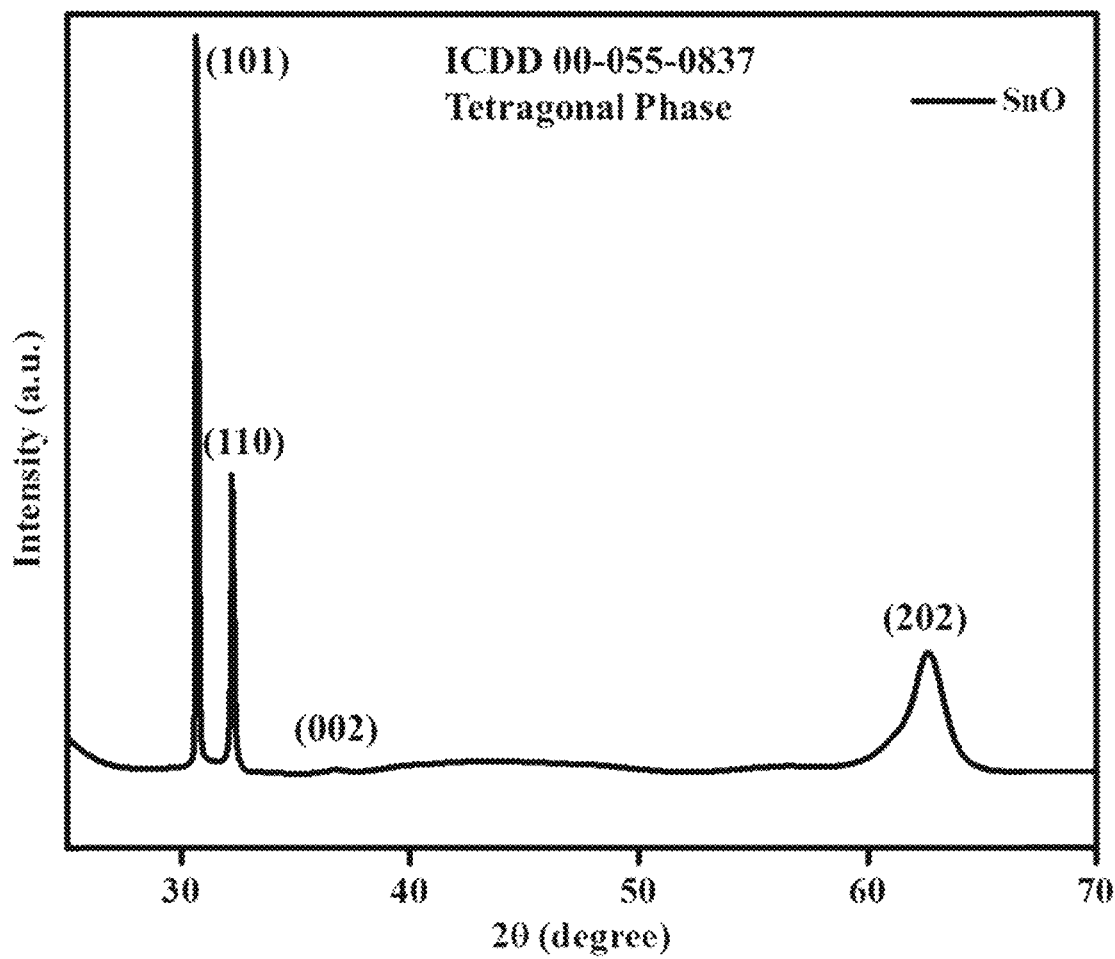
FIG. 4 is an X-ray diffraction (XRD) pattern of the one-dimensional nanoarray.

FIG. 4 is an X-ray diffraction (XRD) pattern of the one-dimensional nanoarray, showing peaks characteristic of SnO. The observed peaks are indexed accordingly: the peaks at 2θ=30° (101), 33° (110), 37° (002) and 63° (202) are characteristic of tetragonal crystal phase (ICDD 00-055-0837).

Figure 5A:
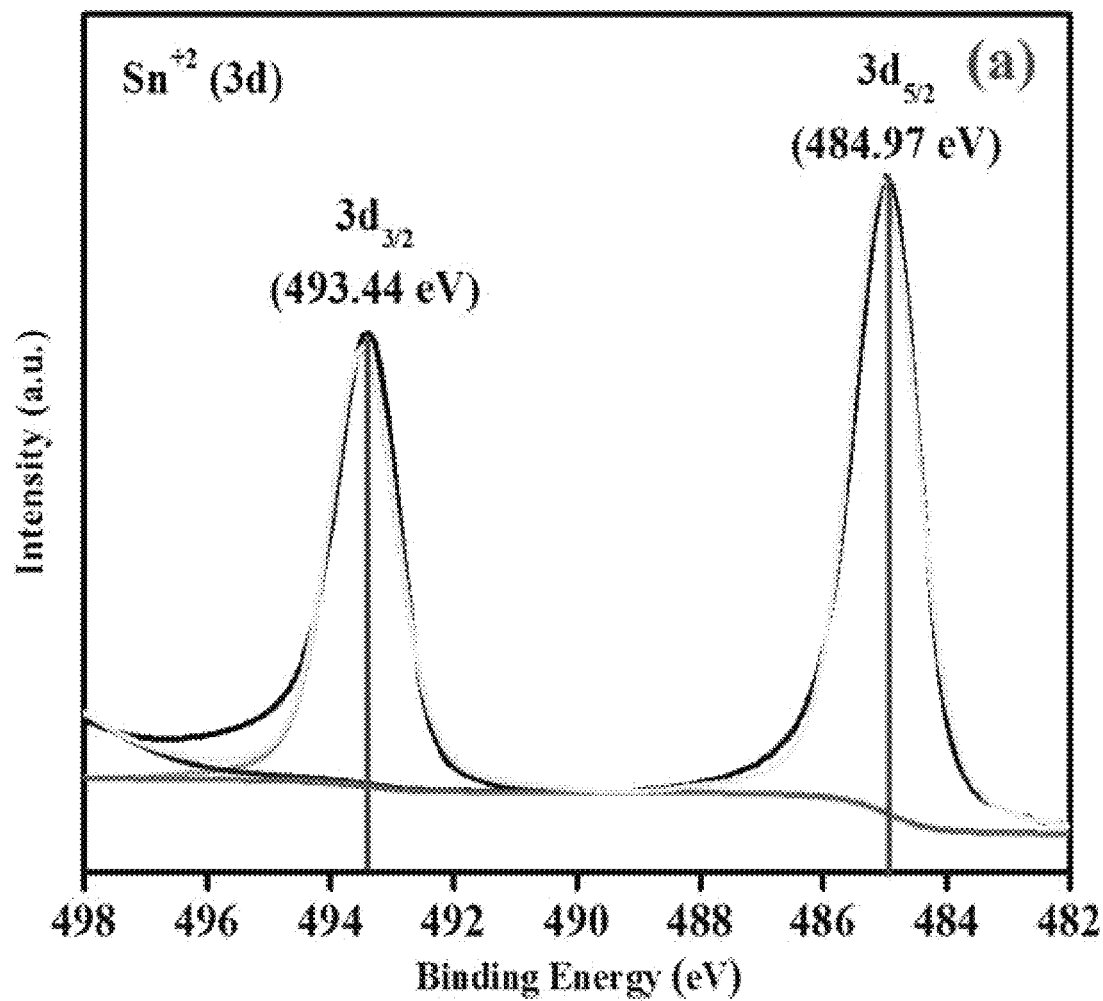
FIG. 5A is an X-ray photoelectron spectroscopy (XPS) spectrum of the one-dimensional nanoarray showing signals from Sn electrons.
Figure 5B:
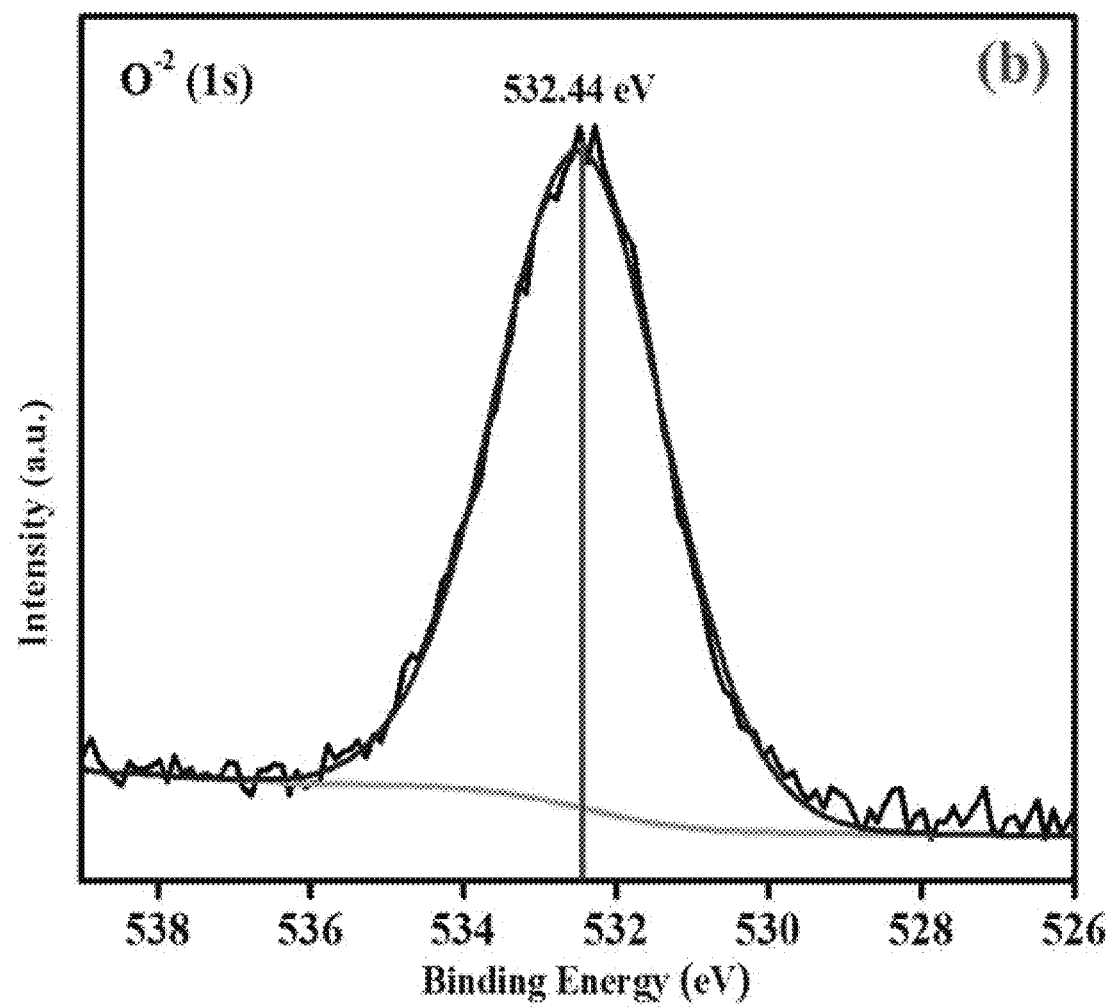
FIG. 5B is an XPS spectrum of the one-dimensional nanoarray showing a signal from $O^{-2}$ electrons.

FIGS. 5A and 5B are X-ray photoelectron spectroscopy (XPS) spectra of the one-dimensional nanoarray. The XPS analysis was carried out to confirm the oxidation states of Sn and O. The spectra shows the existence of the Sn atom by its doublet $3d_{5/2}$ and $3d_{3/2}$ states at 484.97 and 493.44 eV, respectively, in FIG. 5A. The values are shifted from the values of reported $Sn^{+4}$ (486.7 and 495.4 eV) to lower binding energies, which indicates the Sn atom as the $Sn^{+2}$ ion. In FIG. 5B, oxygen also shows a reasonable shift and the typical is peak for $O^{-2}$ is observed at 532.44 eV.

Figure 6:
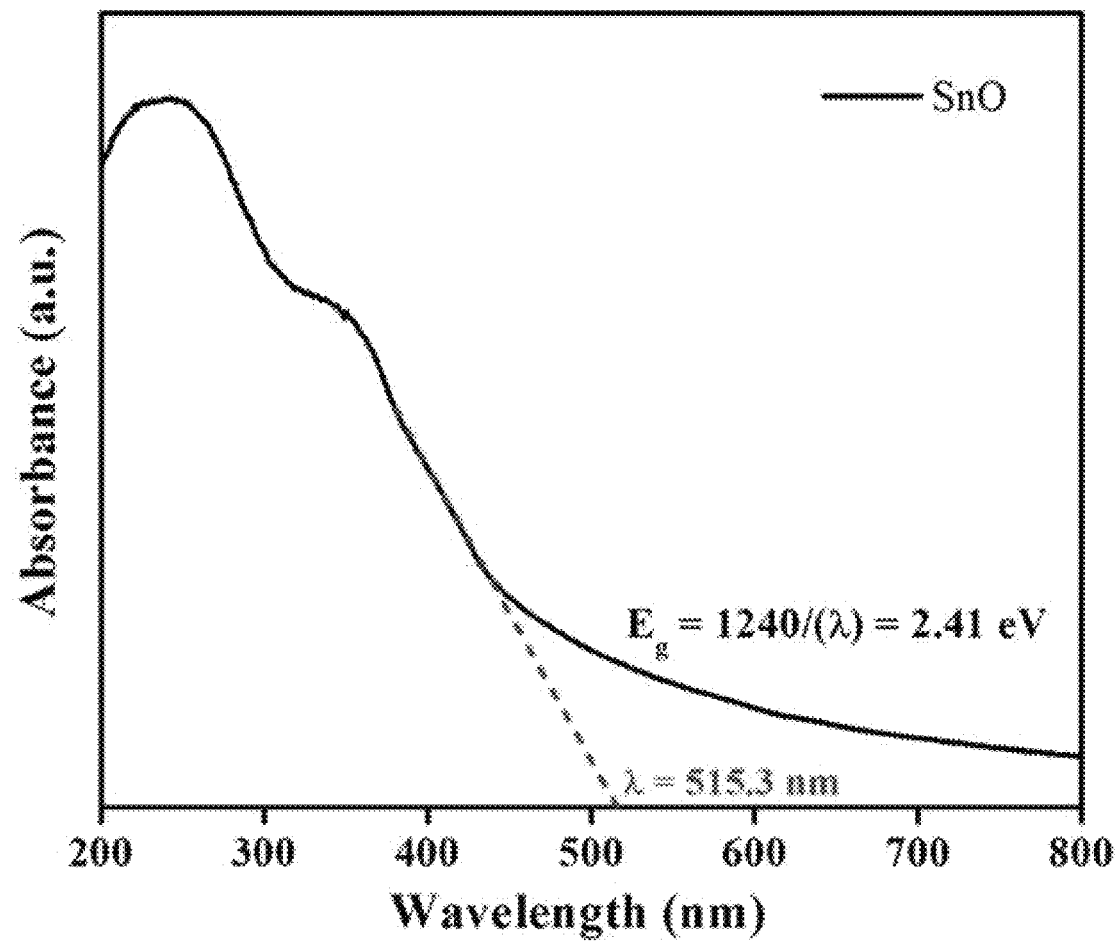
FIG. 6 shows a UV-Vis absorption spectrum of the one-dimensional nanoarray for a bandgap energy calculation.

FIG. 6 shows the UV-Vis absorption spectrum of the one-dimensional nanoarray, recorded via UV-DRS (UV-Vis diffuse reflectance spectra), to calculate the band gap energy. As shown here, the onset point (determined by the dashed line) is recorded at a wavelength of 515.3 nm, which corresponds to a band gap energy of 2.41 eV.

The anodization of SnO Tin(II) oxide (stannous oxide) on Tin foil at room temperature and relatively low voltage has been described. These one-dimensional nanoarrays showed tetragonal crystal structure. FESEM revealed highly uniform one-dimensional nanoarrays on a large-scale surface resulting from a simple low voltage anodization method. XPS analysis was also carried out to better understand the chemical composition of the one-dimensional nanoarrays and the chemical states of tin and oxygen. With a low band gap, the one-dimensional nanoarrays are potential candidates for photo-electrochemical water splitting, and their use in the energy sector may lead to an ultimate reduction in carbon dioxide emissions.

The invention claimed is:

1. A nanoarray structure, comprising:
a one-dimensional nanoarray of SnO nanorods; and
a substrate of Sn:
wherein,
the SnO nanorods have diameters of from 200 nm-1 μm and lengths of 500 nm-3 μm,
an aspect ratio of the longest dimension (length) of the nanorod to the next longest dimension (width) of the nanorod is from 1.5:1-12:1,
an end of each nanorod is attached to the Sn substrate,
the longitudinal axis of each nanorod is substantially perpendicular to the Sn substrate, and
the SnO is in a tetragonal crystal phase.

2. The nanoarray structure of claim 1, wherein the nanorods have conical tips.

3. The nanoarray structure of claim 1, wherein a nanorod nanostructure density is from 220-300 nanostructures per 100 $μm^2$ of the Sn substrate.

4. The nanoarray structure of claim 1, wherein a band gap energy of one-dimensional nanoarray of SnO nanorods is from 2.36 eV to 2.46 eV.

5. The nanoarray structure of claim 1, wherein the nanorods are discrete and separated by inter-nanostructure gaps or an inter-nanostructure distance of 1-50 nm.

6. The nanoarray structure of claim 1, wherein an average surface to surface inter-nanostructure distance of the nanorods is less than 200% of their average diameter.

7. The nanoarray structure of claim 1, wherein an average surface to surface inter-nanostructure distance of the nanorods is less than 10% of their average diameter.

8. The nanoarray structure of claim 1, wherein the SnO nanorods comprise from 0.001 wt % to 5 wt % of at least one material selected from the group consisting of $SnO_2$, alpha Sn and beta Sn.

9. The nanoarray structure of claim 1, further comprising inter-nanostructure gaps in the form of pores or depressions in the substrate which have a maximum depth of 3 μm below that of the original plane of the substrate surface.

10. The nanoarray structure of claim 9, wherein the inter-nanostructure gaps are elongated and form grooves or channels having a width of from 50 nm to 1 μm between rows of nanorods.

11. A photo-electrochemical cell, comprising the nanoarray structure of claim 1.

12. A method for producing the nanoarray structure of claim 1, comprising:
subjecting an electrochemical cell to 15-25 V for 1-3 hours, the electrochemical cell comprising:
a working electrode comprising tin (Sn) foil in contact with an electrolyte solution and
a counter electrode in contact with the electrolyte solution,
wherein nanorods of SnO are grown on the tin foil, forming the one-dimensional nanoarray, and
wherein the tin foil is the substrate.

13. The method of claim 12, wherein the counter electrode comprises gold, platinum, or carbon.

14. The method of claim 12, wherein the counter electrode is in the form of a mesh.

15. The method of claim 12, wherein a surface area of the working electrode in contact with the electrolyte solution is not greater than a surface area of the counter electrode in contact with the electrolyte solution.

16. The method of claim 12, wherein the electrolyte solution has an electrolyte concentration of 0.2-2.0 M.

17. The method of claim 12, wherein the electrolyte solution has a temperature of 20-30° C.

18. The method of claim 12, wherein the electrolyte solution comprises at least one selected from the group consisting of chromic acid, oxalic acid, sulfuric acid, phosphoric acid, and ammonium fluoride.

19. The method of claim 18, wherein the electrolyte solution comprises ammonium fluoride and phosphoric acid.

20. A method of decomposing water into $H_2$ and $O_2$, comprising:
contacting the photo-electrochemical cell of claim 11 with water; and
irradiating the photo-electrochemical cell with an electromagnetic radiation having a wavelength of 200-700 nm.

* * * * *